Sept. 15, 1964 M. J. CELOVSKY 3,149,219
APPARATUS FOR MANUFACTURING TUBE REDUCING
DIES AND ROOLS AND THE LIKE
Filed Feb. 4, 1963 5 Sheets-Sheet 3
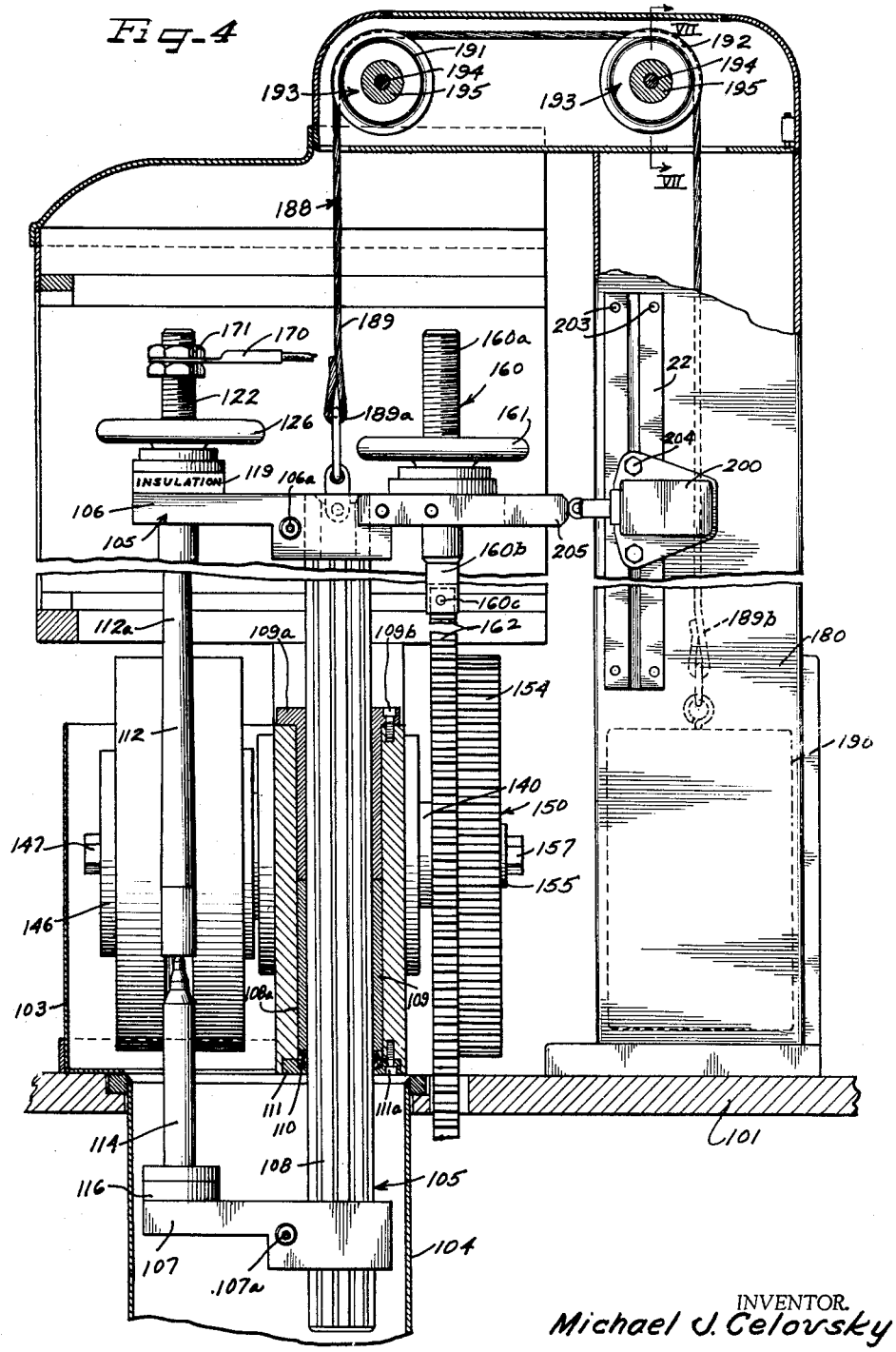
INVENTOR.
Michael J. Celovsky
BY
ATTORNEYS

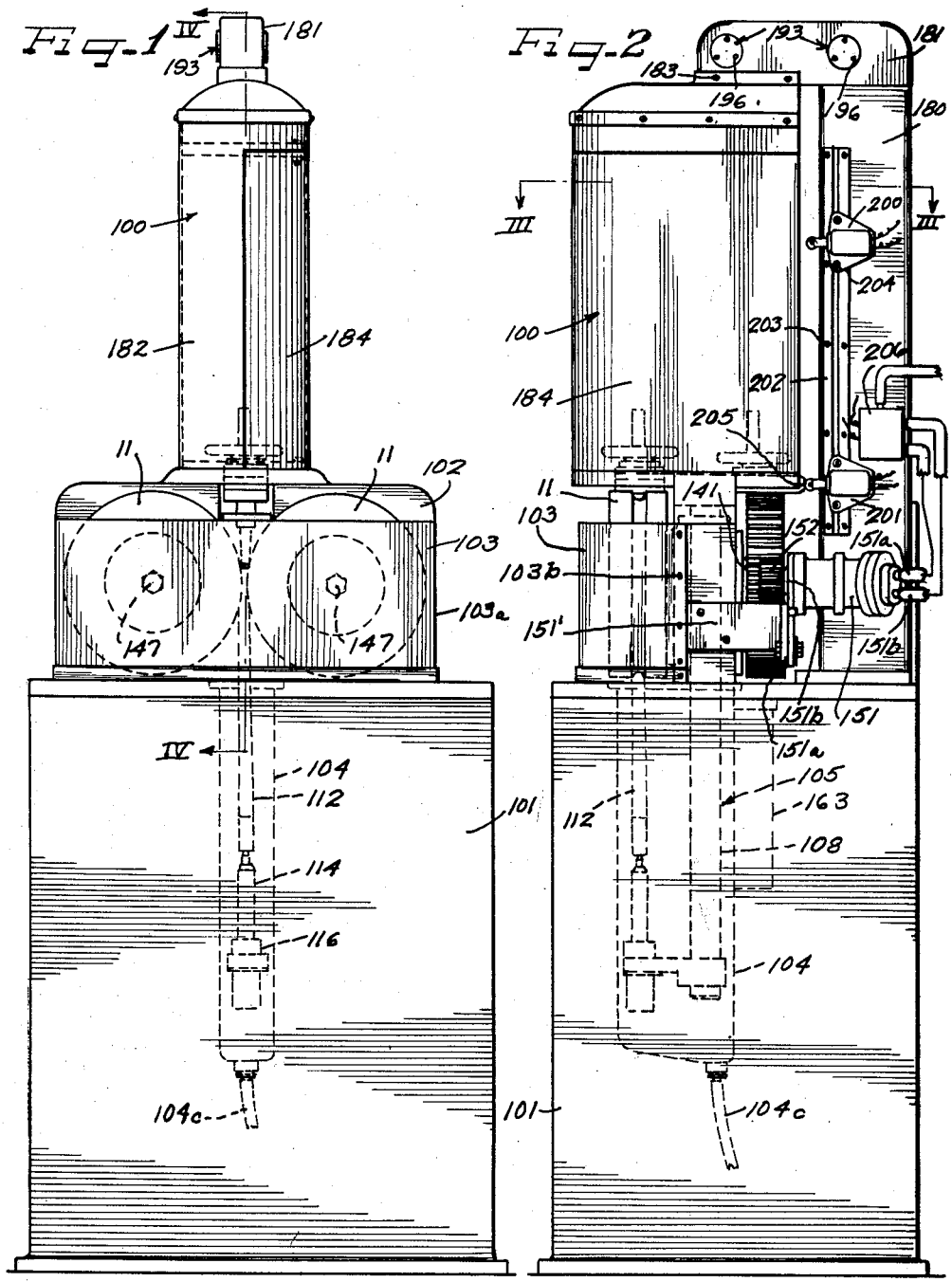

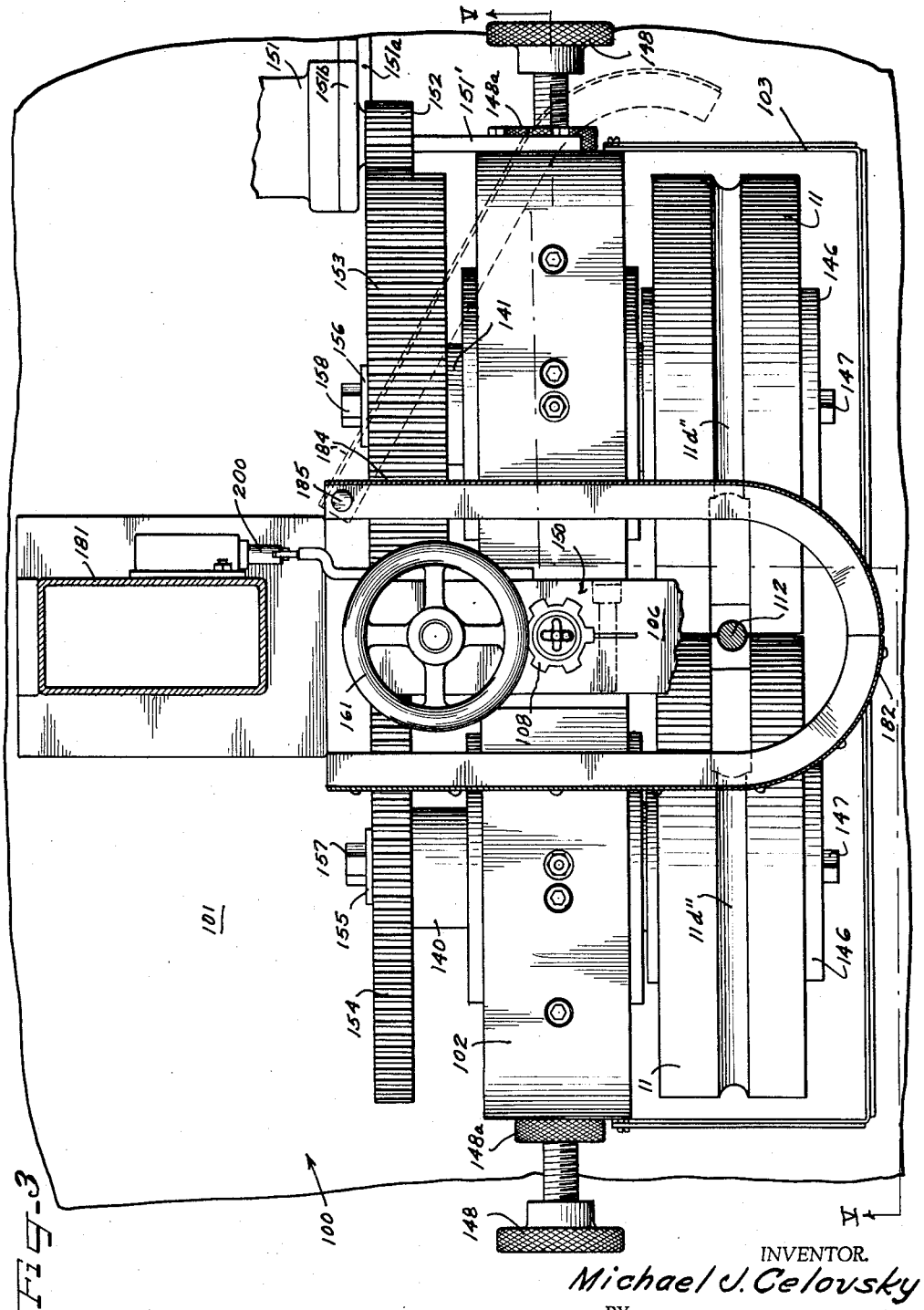

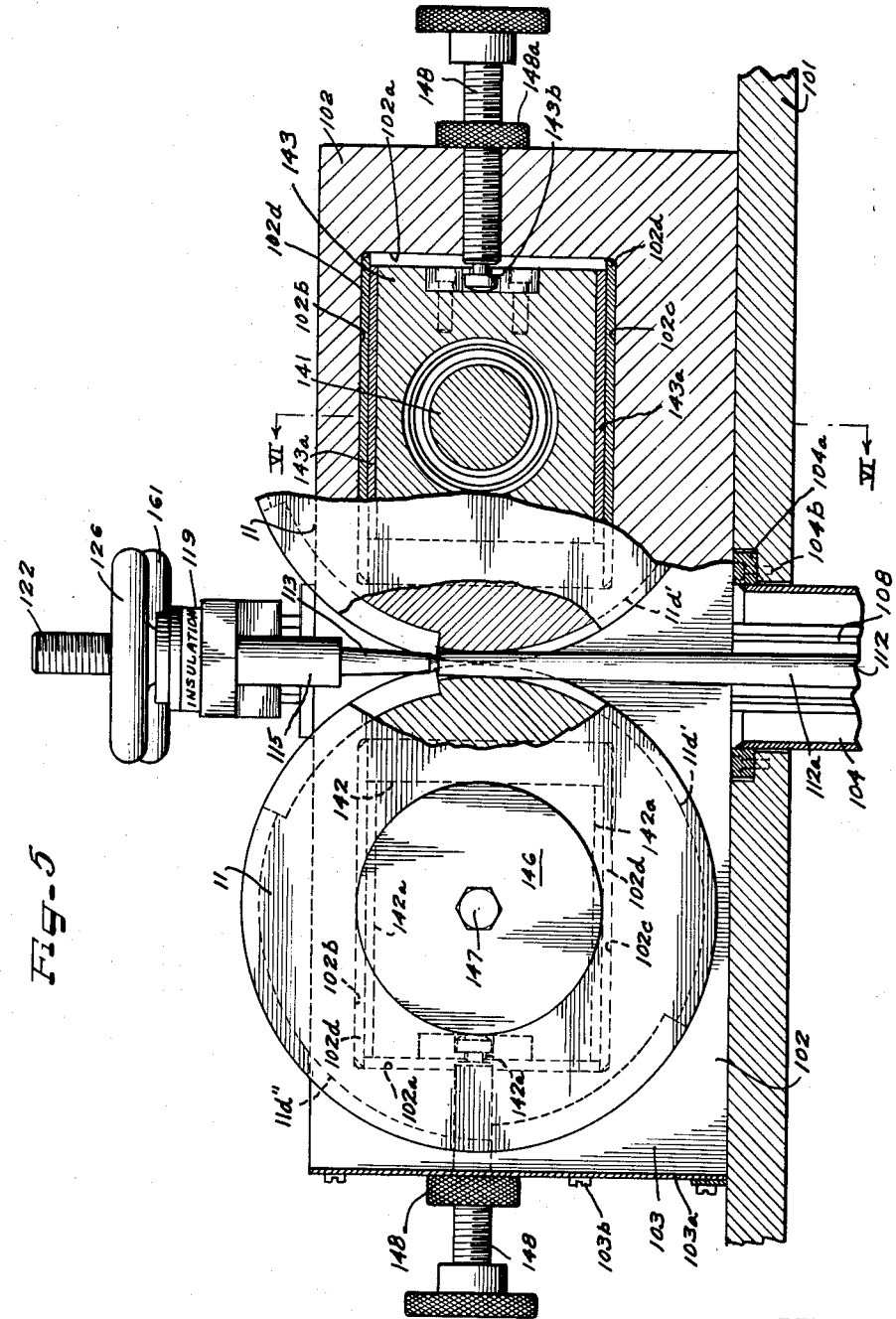

Sept. 15, 1964 M. J. CELOVSKY 3,149,219
APPARATUS FOR MANUFACTURING TUBE REDUCING
DIES AND ROOLS AND THE LIKE
Filed Feb. 4, 1963 5 Sheets-Sheet 5

INVENTOR.
Michael J. Celovsky
BY
ATTORNEYS

United States Patent Office 3,149,219
Patented Sept. 15, 1964

3,149,219
APPARATUS FOR MANUFACTURING TUBE RE-
DUCING DIES AND ROLLS AND THE LIKE
Michael J. Celovsky, 14501 Abington Road,
Detroit 27, Mich.
Filed Feb. 4, 1963, Ser. No. 255,953
12 Claims. (Cl. 219—69)

This invention relates to a new and improved apparatus for cutting electerically conductive materials, more especially hard metals such as carbides, tool steels, and stainless steels, by the erosive effect of electric sparks. The apparatus is particularly adapted for tapering grooves in articles such as rod or tube reducing metal rolls, ring dies, roll dies, half dies, and the like.

The present invention involves improvements on the inventions disclosed in my co-pending application Serial No. 191,136, filed April 30, 1962, entitled "Method and Apparatus for Making Dies and Rolls."

Up to the time of the development of my new apparatus and method disclosed in the aforesaid co-pending application, considerable difficulty has been experienced in the manufacture of tube reducing rolls, for it has been necessary to rough machine tapered grooves in the circumference of the rolls in such a way so as to leave enough material so the tapered grooves could be finished by manual methods after heat treatment. In this regard, it will be appreciated that it is virtually impossible to accurately control and maintain any precise dimension in a metallic roll having surfaces machined therein prior to heat treatment. Once the tool steel has been heat treated, the steel is too hard to machine and it is for this reason that the tapered grooves were commonly formed to final shape by hand methods.

As a result of the development of the inventions defined in my aforesaid application, it is now possible to rough and finish machine the circumferential tapered roll grooves as well as relief angles tangential to the radius of the groove in rolls made from hard materials such as tool steel after the rolls have been heat treated so that the time consuming expensive hand methods previously employed are no longer necessary.

As a further result of experiments with the machine disclosed in my aforesaid application, I have found that the machine may be more effectively operated by providing means on the machine enabling the roll supporting shafts to be moved transversely towards and away from one another so that different sized rolls can be quickly and conveniently mounted and machined on my apparatus. As a safety measure, I have further found it to be desirable to encase the cutting area of the electrode within a protective guard housing to safeguard the operator and others in the area of the machine. The guard housing is provided with a door to permit periodic viewing of the cutting operation by the operator.

According to still other important features of this invention, I have provided my apparatus with a counterbalancing system which operates to aid in overcoming the force required to move the electrode upwardly during the cutting operation. By employing a counterweight system, it has been found that the machining operation may be carried out more smoothly.

According to still other important features of this invention, I have provided my apparatus with means for automatically returning the electrode to its starting position after the cutting stroke has been completed.

It is therefore an important object of this invention to provide a smoother cutting action on a machine for the electric spark machining of tube reducing rolls, dies, and the like.

Another object of this invention is to provide an apparatus for machining dies and rolls having safety features for the protection of the machine operator.

Yet another object of this invention is to provide a new and improved machine which can be more conveniently operated to machine dies and rolls of different sizes whereby machine set-up time can be materially reduced.

Still another feature of this inveniton is to provide means for automatically returning the electrode to its starting position after its cutting stroke has been completed.

Other objects and features of this invention will more fully become apparent in view of the following detailed description taken in conjunction with the accompanying drawings illustrating a single embodiment and in which:

FIGURE 1 is a front elevation of an apparatus for machining dies and rolls which embodies important features of my invention;

FIGURE 2 is a side elevation of the apparatus shown in FIGURE 1;

FIGURE 3 is an enlarged fragmentary partially sectioned plan view taken substantially on the line III—III looking in the direction indicated by the arrows as shown in FIGURE 2;

FIGURE 4 is an enlarged fragmentary vertical section taken substantially on the line IV—IV looking in the direction indicated by the arrows as shown in FIGURE 1;

FIGURE 5 is an enlarged fragmentary vertical section taken substantially on the line V—V looking in the direction indicated by the arrows as shown in FIGURE 3;

Figure 6:
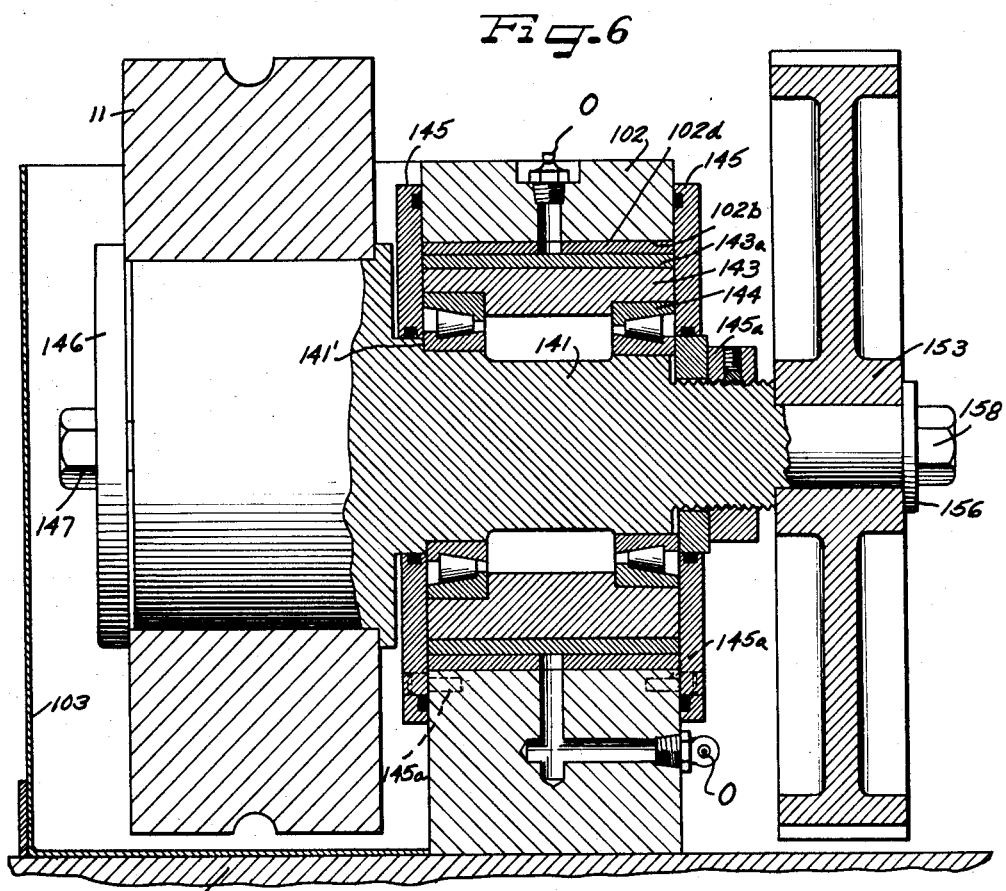
FIGURE 6 is an enlarged fragmentary vertical section taken substantially on the line VI—VI looking in the direction indicated by the arrows as shown in FIGURE 5.

An apparatus 100 is provided for machining metal articles such as rolls which apparatus includes a base or frame 101. A journal block 102 is mounted on the frame 101 and a fluid bath 103 is disposed adjacent the block 102 on the frame. In this regard it will be noted the bath 103 includes a U-shaped plate 103a which is secured by fasteners 103b to the block, the block forming a side wall of the bath 103.

The bath 103 has a lower end or sump 104 disposed below the part of the frame 101 on which the block 102 is supported, as shown in FIGURE 5. Mounted within the bath including the sump 104 is a vertically movable carriage 105. The carriage 105 includes upper and lower carriage plates 106 and 107 which are joined together by means of a splined shaft 108. Opposite ends of the splined shaft 108 are disposed and secured in locked assembly with the plates by means of fasteners or screws 106b and 107b (FIG. 4).

Figure 7:
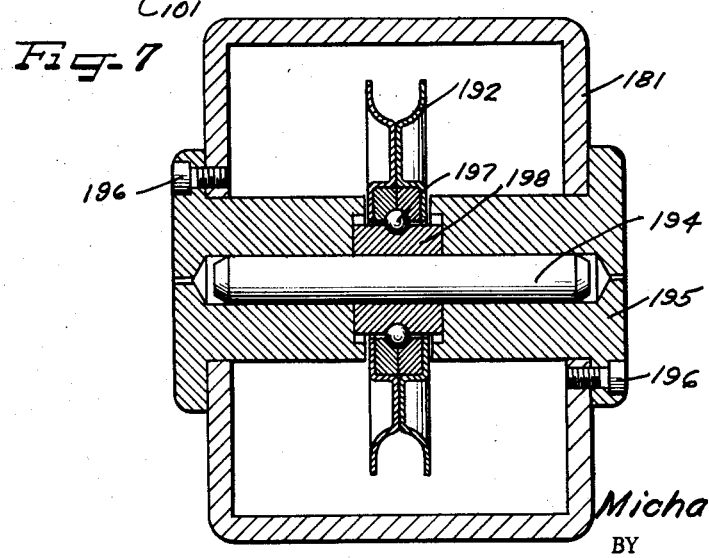
FIGURE 7 is an enlarged vertical section taken substantially on the line VII—VII looking in the direction indicated by the arrows as shown in FIGURE 4.

It will be noted from a consideration of FIGURE 4 that the splined shaft 108 extends through a vertically extending shaft block bore 103a and more particularly through a bushing 109. The bushing 109 has a collar 109a at one end and is secured to the block by means of fasteners 109b. It will further be noted from FIGURE 3 that the bushing 109 is splined for proper fitting with the splined shaft 108. The lower end of the bushing 109 may be provided with a series of circumferentially spaced recesses and pieces or strips of felt packing may be disposed in each of the recesses and engaged in the splined grooves on the splined shaft 108 for the purpose of wiping the grooves free of metal particles before the splined shaft 108 is engaged with the splined bore of the bushing 109 as shown in FIGURES 7 and 8 of my aforesaid U.S. application for patent.

A bushing ring or collar 111 is secured to the block 102 by means of collar fasteners 111a for the purpose of clamping the felt ring 110 against the sleeve 108a. When the felt needs to be replaced, the collar 111 can be readily removed from the block to enable old felt pieces and the ring to be removed so that new ones can be substituted. In summary, as the carriage 105 is moved vertically in the bath 103, the splined shaft 108 moves vertically of the block 102. The bath 103 including the sump is filled with a suitable dielectric or oil or particles cut from the articles or rolls being machined fall to the bottom of the sump 104. Some of these particles are in suspension in the oil and unless the block 102 is provided with means for cleaning out the grooves in the splined shaft 108, the life of the splined shaft 108 will be reduced.

Mounted on the carriage 105 is an electrode 112 which preferably has a conical or tapered configuration and may be made of any suitable material suitable for use in an electrical discharge machining operation. The peripheral surface 112a of the electrode must be very carefully shaped since its configuration is to be imparted to the articles or rolls 11 to be manufactured. In this instance, since it is desired to machine tapered grooves in the rolls 11, the electrode 112 is constructed so as to have a tapered or conical shape. It is in this way that tapered semi-circular shaped grooves can be simultaneously machined in the periphery of a pair of rolls 11 disposed in side-by-side spaced relation, as shown in FIGURE 5 and as described at length in my aforesaid copending application.

Needle holders 115 and 116 are provided for securing the needles 113 and 114 to the plates 106 and 107. The details of the needle holders 115 and 116 are disclosed in FIGURE 6 of my aforesaid copending application.

Secured with a threaded end 122 of a holder rod is a hand wheel 126. In operation, as the hand wheel 126 is turned, the holder rod as well as the needle 113 are caused to move vertically of the plate into and out of engagement with respect to the electrode 112.

The needle 114 has a threaded end (not shown) which is secured in threaded assembly with the holder 116. The vertical position of the needle 114 may be adjusted by rotating the needle 114 so that it may be moved either upwardly or downwardly with respect to the lower needle holder 116. The holder 116 may be secured to an electrical insulator or bushing as shown in my co-pending application.

Roll supporting shafts 140 and 141 (FIGURE 3) are journalled on slidable bearing blocks 142 and 143 by means of identical bearings 144 (FIGURE 6) with the bearings 144 only being shown for the shaft 141. The bearings 144 may be of any suitable type. The slidable bearing blocks 142 and 143 are disposed in recessed areas 102a, 102a in the main block 102. Upper and lower recess walls 102b and 102c on each area 102a are provided with hardened metal bearing plates or surfaces 102d, 102d. The blocks 142 and 143 are also provided with hardened metal bearing plates or surfaces 142a, 142a and 143a, 143a. In order to secure the bearings 144 with the block 102, each of the shafts 141 and 142 are provided with a pair of rings 145, 145 which are suitably secured to the block 102 by fasteners 145a. Each set of the rings 145, 145 are secured on the shafts 140 and 141 against shaft shoulders such as indicated at 141' by means of lock nut 145a which is threaded thereon.

The shafts 140 and 141 are provided with front and rear ends. The outer shaft ends 140a and 141a are each provided with keys as shown in my co-pending application which are secured in the keyways on the rolls 11 so that when the rolls 11 are mounted on the outer ends of the shafts they will not rotate relative to the shafts. Means is provided on each of the shafts for fixedly clamping the roll to the associated end of the shaft. This means includes roll support plates and fasteners 146 and 147, the fastener 147 being in threaded assembly with the front end of one of the shafts to secure the plate 146 in clamped assembly therewith whereby the roll is held in clamped assembly with the associated roll support shaft.

In order to permit the slidable blocks 142 and 143 to move, block actuators or threaded bolts 148 are threaded through opposite ends of the block 102 and locked by means of lock retaining shoulders 142b, 142b (FIGURE 5). After the positions of the slidable blocks are adjusted, lock nuts 148a, 148a are turned on bolts 148 into engagement with the main block 102. Oil cups O are provided for lubricating the plates 102d, 102d engaged with plates 142a, 142a; 143a, 143a.

*Carriage and Roll Actuating Mechanism*

The reference numeral 150 indicates generally a carriage and roll actuating mechanism. This mechanism includes a prime mover which may be of any suitable type such as a fluid motor as indicated at 151 in FIGURE 3. The fluid motor has fluid lines 151a' and 151b' for controlling the operation of the fluid motor.

A motor support plate 151a is secured to the block 102 by suitable fasteners as shown in FIGURE 3. The motor may be pivoted on motor pivot plate 151b as shown in FIGURE 5 of my aforesaid application. Mounted on a motor drive shaft 151' is a pinion gear 152. The pinion gear 152 is in meshed engagement with rack drive gear 153 and the rack drive gear 153 is in mesh with the driven gear 154.

The gears 153 and 154 are mounted on the rear ends of the shafts or spindles 140 and 141 as shown in FIGURE 3. Gear fastener plates 155 and 156 and gear plate fasteners 157 and 158 are provided for attaching the gears 153 and 154 on the spindles 141 and 140. It will therefore be seen that the spindle bearings provide bearings not only for the rolls but also for the gears for driving the rolls, the rolls and gears being disposed at opposite ends of the spindles 140 and 141.

Mounted on the upper plate 106 of the carriage 105 is a rack holder 160. The rack holder 160 has a threaded end 160a and a rack turn wheel 161 is secured to it for the purpose of moving the holder 160 vertically up and down. The holder 160 has a yoke 160b at its opposite end and a rack 162 is secured to the yoke 160b by means of yoke pin 160c. The rack 162 is in mesh with the rack drive gear 153 so that the carriage 105 can move up and down by the operator through manipulation of the controls of the reversible fluid motor 151. The lower end of the rack 162 extends into a rack guide housing 163 which is disposed below the base 101 (FIGURE 5).

A rack guide block and a guide may be secured to the main block 102 by fasteners as shown in my co-pending application. The guide bears against the rack 162 during its vertical movement to maintain the rack in contact with the gear 153.

In view of the foregoing description, it will be appreciated that a single reversible fluid motor 151 may be employed to operate the carriage as well as to rotate the rolls toward the electrodes as the electrode is moved vertically upwardly in the space between the rolls.

In order to circulate oil through the oil bath 103 and the sump 104, a motor and pump are provided (not shown) as well as a fluid line one of which is joined with the lower end of the sump at 104c to permit the oil in the sump and the bath to be circulated and cleansed of metal particles. Also, the sump 104 has a ring 104a (FIGURE 4) in welded assembly therewith. The ring 104a suspends the sump on frame or base shoulder 101a, the ring 104a being secured by fasteners such as bolts 104b to the base 101.

In the event that the oil in the bath 103 overflows, the base 101 may be provided with a dished area to collect any oil spillage whereupon the oil is returned to the oil circulating system by means of suitable fluid line (not shown).

The technique of electrically discharging an electrode for the electrical discharge machining of an article, broadly speaking, is well known as set forth in the U.S. Patent 2,526,423. With respect to the present apparatus, the negative pole of a supply circuit is connected with the electrode 112 to effect electrical discharge from the electrode, and the positive pole of the circuit is connected to the workpiece or to the rolls 11. It will be noted in FIGURE 4 a power line 170 is secured by nuts 171 to the threaded end 122 of the needle holder rod. The frame 101 is grounded in any suitable manner. The electrical principles for effecting electric spark machining or cutting of metal are well known in the art, such as is set forth in the U.S. Patent 2,526,423.

If desired, the frame 101 and all of the structures mounted thereon can be rotated 90° to permit the electrode to be fed horizontally into the rolls to machine them. The positioning of the bath may be then altered in the manner shown in the U.S. Patent 2,526,423, if desired.

*Column and Guard Housing*

Mounted upon the base or frame 101 is a vertical column 180 having a column arm at its upper end overhanging the bath 103. Mounted upon the main block 102 is a guard housing 182 which is secured at its upper end by means of bolts 183 to the overhanging column arm 181. The guard housing 182 is provided with a guard housing door 184 which is mounted on the housing by means of a door pivot 185. The door 184 may be pivoted in the manner shown in FIGURE 3 to permit the cutting zone between the rolls 11 and the electrode 112 to be examined. During normal operation, the door is left closed as a safety measure.

*Counterbalance Mechanism*

Means comprising a counterbalance mechanism 188 is provided for improving the machining action of the electrode 112. The counterbalance means or mechanism 188 is illustrated in FIGURE 4 and includes a cable 189 which has an end 189a that is fastened with the carriage 105. An opposite end 189b of the cable 189 is fastened to a counterweight 190. It will be noted that the counterweight 190 is lodged within the tubular column 180 and is adapted to move vertically in the column as the carriage 105 is moved up and down. A pair of pulleys 191 and 192 are secured with the overhanging column arm 181 by means of pulley mounts 193, 193, which are identical to one another. Each of the pulley mounts includes a fixed shaft 194 which is encased within a sleeve which has opposite ends secured with the overhanging column arm 181 by means of sleeve fasteners 196. Each of the pulleys is mounted upon bearings 197 and a ring bushing 198 is mounted on the fixed shaft 194 for sustaining the bearings 197 thereon.

During the operation of the apparatus, the counterbalancing means helps to overcome the force required to move the electrode vertically upwardly during the cutting operation. Preferably, the counterweight 190 weighs several pounds in excess of the combined weight of the carriage 106 including the electrode 112 and the electrode holders 113 and 114.

To aid in the up and down movement of the carriage 106, upper and lower limit switches 200 and 201 are mounted upon the vertical tubular column 180. These switches are secured to a limit switch rack 202. The rack is mounted on the column 180 by means of the fasteners 203. The switches 200 and 201 may be moved vertically on the limit switch rack 202 into selected adjusted positions and secured in such positions by means of the fasteners 204.

Mounted upon the upper plate of the carriage 106 is a limit switch actuator 205.

When the machining operation is to be started, the operator will press a button causing the fluid motor 151 to actuate the gears for moving the carriage 105 vertically upwardly and for rotating the spindles or shafts 140 and 141 in opposite directions with respect to one another and towards the electrode 112. As the electrode is moved between the rolls, the rolls 11 are machined as shown in FIGURE 5. After the machining operation has been completed, the actuator 205 strikes the limit switch 200 and a signal is relayed to a solenoid valve 206 which reverses the fluid flow to the fluid motor 151 causing the pinion gear 152 to rotate in an opposite direction whereby the carriage 106 is dropped vertically while the rolls 11 are rotated in an opposite direction with respect to their previous direction of rotation. When the carriage 106 arrives at the position from which it started, the limit switch actuator 205 strikes the lower limit switch 201 and the power for the entire machine is shut down.

It will be appreciated that where the size of the rolls 11 is to be varied, that is, a smaller or larger size roll is to be mounted upon the spindles, it will be understood that the size of the gears 153 and 154 must be varied to compensate for the shift in the position of the shafts 140 and 141 or with respect to the rack and with respect to one another so that the gears and the rack may be maintained in meshed engagement together.

*Operation*

After the rolls 11 have been formed to shape, as shown in FIGURE 15, they are then mounted on the apparatus 10 for the purpose of tapering the grooves 11d' so as to provide tapered semi-circular grooves 11d'', as shown in FIGURE 5. The electrode 112 is moved vertically in the gap between the rolls to effect electrical discharge of the grooves 11d' for tapering them. During the machining operation the surface of the electrode 112 is at all times maintained in spaced relation with respect to the surface of the rolls being machined to prevent a short circuit. The spacing between the electrode and the surface being machined may be varied to vary the finish being machined on the rolls. During the machining operation, the oil is continuously circulated about the electrode so that the cut metal particles are conveyed away from the cutting area. While a bath has here been employed, it will also be appreciated that with respect to the broad principles of the present invention, an oil stream could be directed against the rolls and the electrode in the cutting zone so as to immerse the cutting zone with oil as shown in U.S. Patent No. 2,526,423. In order to insure that the cutting zone is properly immersed in oil, it is preferable that a cutting zone be immersed in an oil bath as shown in the drawings. The keys on the spindles serve to properly align the rolls with respect to one another so that the rolls may be uniformly machined and used as a pair in a roll forming machine. First one groove on each of the rolls is machined and then the rolls 11 are removed from the machine and turned back side front and remounted on the spindles so that the keys are engaged in the keyways. Then the electrode is again caused to move vertically upwardly through the space between the rotating rolls to provide a second tapered groove 11d'' in each of the rolls. These rolls which are comprised of a heat treated hardened metal after being provided with tapered arcuate tube forming grooves are then polished by rubbing the grooves with an orange wood until provided with a 15–20 microfinish thereon.

Although minor modifications might be suggested by those versed in the art, it should be understood that I wish to embody within the scope of the patent warranted hereon, all such modifications as reasonably and properly come within the scope of my contribution to the art.

I claim as my invention:

1. In an apparatus for machining circumferentially extending tapered grooves in a pair of metal articles while in a heat treated hardened state which includes
    a fluid bath,
    means for supporting the articles in side-by-side relation in said bath including a pair of spindles,
    a tapered electrical discharge electrode having a configuration corresponding to the groove shape to be machined in the metal article mounted to one side of the electrode,
    means for moving said spindles towards and away from one another as well as towards and away from said electrode to permit varying sized articles to be mounted on said spindles for machining by said electrode, means for energizing the electrode and for causing the tapered electrode to emit an electrical spark discharge for effecting cutting of the groove in a surface of each of the articles, and means for moving the energized electrode in the bath tangentially of the articles while contemporaneously moving the articles in arcuate paths of rotation on opposite sides of the electrode to establish cutting zones along the article surfaces opposite the electrode.

2. In an apparatus for machining circumferentially extending tapered grooves in a pair of metal articles while in a heat treated hardened state which includes a fluid bath, means for supporting the articles in side-by-side relation in said bath including a pair of spindles, a tapered electrical discharge electrode having a configuration corresponding to the groove shape to be machined in the metal article mounted to one side of the electrode, means for moving said spindles towards and away from one another as well as towards and away from said electrode to permit varying sized articles to be mounted on said spindles for machining by said electrode, means for energizing the electrode and for causing the tapered electrode to emit an electrical spark discharge for effecting cutting of the groove in a surface of each of the articles, means for moving the energized electrode in the bath tangentially of the articles while contemporaneously moving the articles in arcuate paths of rotation on opposite sides of the electrode to establish cutting zones along the article surfaces opposite the electrode, and means comprising a guard housing enclosing the cutting zones and with said guard housing having a door movable for viewing the cutting zones.

3. In an apparatus for machining circumferentially extending tapered grooves in metal rolls while in a heat treated hardened state which includes a frame, a block on said frame, a fluid bath on the frame adjacent the block, a vertical column on the frame having a supporting arm overhanging the bath, counter balance means carried by said column and arm, a carriage movably supported on said frame and joined with said counterbalance means, roll supporting spindles journalled on said block each for supporting a roll at one end in said bath, means for moving said spindles toward and away from one another to permit different sized rolls to be mounted thereon, meshed roll gears mounted on opposite ends of said spindles, an electrical discharge electrode having a longitudinally tapered substantially smooth exterior surface carried by said carriage for machining the rolls, means for energizing the electrode and for causing the electrode to emit an electrical spark discharge for effecting machining of the rolls, a rack secured to said carriage in mesh with one of said roll gears, and a power driven gear in mesh with one of said roll gears for rotating said roll gears in arcuate paths toward one another and with said power driven gear being cooperable with said counterbalance means for causing vertical movement of the rack, carriage and electrode in unison together, whereby the energized electrode is caused to move tangentially of the rolls to establish a cutting zone along the roll surfaces opposite the electrode.

4. In an apparatus for machining metal articles such as rolls which includes a frame, a carriage movably supported on said frame, means comprising a pair of slidable shaft support blocks mounted on said frame for supporting rotatable shafts on said frame, means for fixing said shaft support blocks in adjusted position on said frame, rotatable roll support shafts journalled on said slidable support blocks each for supporting a roll at one end, an electrode holder mounted on said carriage, an electrical discharge electrode having a longitudinally tapered substantially smooth exterior surface carried by said holder on said carriage for machining the rolls, means connected to said rotatable shafts for rotating said rotatable shafts in arcuate paths toward one another and for causing vertical movement of said carriage and electrode in unison together between said rotatable roll support shafts with the electrode being moved tangentially of the rolls on said rotatable roll support shafts to establish cutting zones along roll surfaces opposite the electrode, and means for immersing the cutting zones in electrolyte.

5. In an apparatus for machining metal rolls which includes a frame, a fluid bath on the frame, a carriage movably supported on said frame, rotatable shafts each for supporting a roll at one end in said bath, means for supporting said rotatable shafts on said frame, meshed roll gears mounted on opposite ends of said shafts, an electrode holder mounted on said carriage, an electrical discharge electrode having a longitudinally tapered substantially smooth exterior surface carried by said carriage for machining the rolls, means for energizing the electrode and for causing the electrode to emit an electrical spark discharge for effecting machining of the rolls, a rack secured to said carriage in mesh with one of said roll gears, counterbalance means including a weight mounted on said frame and connected to said carriage for smoothing upward vertical movement of the electrode during the machining of the rolls and with the weight being heavier than the combined weight of the carriage, electrode, and the electrode holder, and a power driven gear in mesh with one of said roll gears for rotating said roll gears in arcuate paths toward one another and for causing vertical movement of the rack, carriage and electrode in unison together, whereby the energized electrode is caused to move tangentially of the rolls to establish a cutting zone along the roll surfaces opposite the electrode.

6. In an apparatus for electric spark machining circumferentially extending tapered grooves in metal dies which includes a frame having a bath, a column having a column arm on an upper end, rotatable shafts each for supporting a die at one end in said bath, means for supporting said rotatable shafts on said frame, a carriage, an electrical discharge electrode having a longitudinally tapered substantially smooth exterior surface mounted on said carriage for machining the dies, counterbalance means including a weight mounted on said column and on said column arm and connected to said carriage for smoothing upward vertical movement of the electrode during the machining of dies and with the weight being heavier than the combined weight of the carriage and the electrode, and means for rotating said rotatable shafts in arcuate paths toward one another and for causing vertical movement of the carriage and electrode in unison together between said rotatable shafts.

7. The apparatus of claim 6 further characterized by means comprising a guard housing being supported on said frame and on said column enclosing cutting zones between said electrode and dies adjacent thereto and with said guard housing having a door movable for viewing of said electrode.

8. In an apparatus for machining circumferentially extending tapered grooves in metal articles such as dies and rolls which includes a frame, a carriage movably supported on said frame, means comprising a pair of slidable shaft support blocks mounted on said frame for supporting rotatable shafts on said frame, means for moving said shaft support blocks on said frame and for fixing said shaft support blocks in adjusted position on said frame, rotatable roll support shafts journalled on said slidable support blocks each for supporting a roll at one end, an electrode holder mounted on said carriage, an electrical discharge electrode having a longitudinally tapered substantially smooth exterior surface carried by said holder on said carriage for machining the rolls, means connected to said rotatable shafts for rotating said rotatable shafts in arcuate paths toward one another and for causing vertical movement of said carriage and electrode in unison together between said shafts with the electrode being moved tangentially of rolls on said shafts to establish cutting zones along roll surfaces opposite the electrode, and means for directing fluid across the cutting zones.

9. In an apparatus for machining circumferentially extending tapered grooves in metal articles such as dies and rolls which includes a frame having a main block thereon, a carriage movably supported on said frame, means comprising a pair of slidable shaft support blocks mounted in recessed areas in said block for supporting rotatable shafts on said block, means for fixing said shaft support blocks in adjusted position in said recessed areas, rotatable shafts journalled on said slidable support blocks each for supporting a roll at one end, an electrode holder mounted on said carriage, an electrical discharge electrode having a longitudinally tapered substantially smooth exterior surface carried by said holder on said carriage for machining the rolls, means connected to said rotatable shafts for rotating said rotatable shafts in arcuate paths toward one another and for causing vertical movement of said carriage and electrode in unison together between said shafts with the electrode being moved tangentially of rolls on said shafts to establish cutting zones along roll surfaces opposite the electrode, and means for directing fluid across the cutting zones.

10. The apparatus of claim 9 further characterized by said recessed areas and said slidable shaft support blocks having hardened engaged bearing surfaces to minimize wear in the movement of said slidable shaft support blocks relative to said main block.

11. In an apparatus for machining circumferentially extending tapered grooves in metal articles such as dies, rolls and the like which includes a frame having a column thereon with a column arm overhanging said frame, spaced upper and lower limit switches mounted on said column, rotatable shafts each for supporting an article at one end, means for supporting said rotatable shafts on said frame, a carriage having a limit switch actuator thereon cooperable with said limit switches, an electrical discharge electrode having a longitudinally tapered substantially smooth exterior surface carried by said carriage for machining articles, counterbalance means including a weight mounted on said column and joining said carriage arm with said carriage for assisting in upward vertical movement of the electrode during the machining of articles on said shafts, means for rotating said rotatable shafts in arcuate paths toward one another and for causing vertical movement of the carriage and electrode in unison together with the electrode being movable tangentially of the articles to establish cutting zones along article surfaces opposite the electrode and with said upper limit switch being operable to cause the electrode to return to a starting position upon being tripped by said limit switch actuator and with said lower limit switch being operable to turn off said apparatus upon being tripped by said limit switch actuator, and means for immersing electric spark discharge areas of the electrode in dielectric fluid.

12. In an apparatus for machining circumferentially extending tapered grooves in metal articles such as dies, rolls and the like which includes a frame having a column thereon, spaced upper and lower limit switches mounted on said column, rotatable shafts each for supporting an article at one end, means for supporting said rotatable shafts on said frame, a carriage having a limit switch actuator thereon cooperable with said limit switches, an electrical discharge electrode having a longitudinally tapered substantially smooth exterior surface carried by said carriage for machining articles, a guard housing enclosing said electrode and cutting zones defined by the electrode with said housing being disposed at one side of said column, means for rotating said rotatable shafts in arcuate paths toward one another and for causing vertical movement of the carriage and electrode in unison together with the electrode being movable tangentially of the articles to establish cutting zones along article surfaces opposite the electrode and with said upper limit switch being operable to cause the electrode to return to a starting position upon being tripped by said limit switch actuator and with said lower limit switch being operable to turn off said apparatus upon being tripped by said limit switch actuator, and means for immersing electric spark discharge areas of the electrode in dielectric fluid.

References Cited in the file of this patent

UNITED STATES PATENTS

| 832,304 | Farrington | Oct. 3, 1906 |
| 2,116,387 | Driggs et al. | May 3, 1938 |
| 2,263,740 | Sample | Nov. 25, 1941 |
| 2,765,394 | Griffith | Oct. 2, 1956 |
| 2,773,968 | Martellotti et al. | Dec. 11, 1956 |

FOREIGN PATENTS

| 1,168,300 | France | Aug. 25, 1958 |